April 19, 1927.  
G. KAMMERER  
1,625,414  
TOOL FOR CUTTING AND REMOVING PIPE FROM WELLS  
Filed May 3, 1923  
2 Sheets-Sheet 2

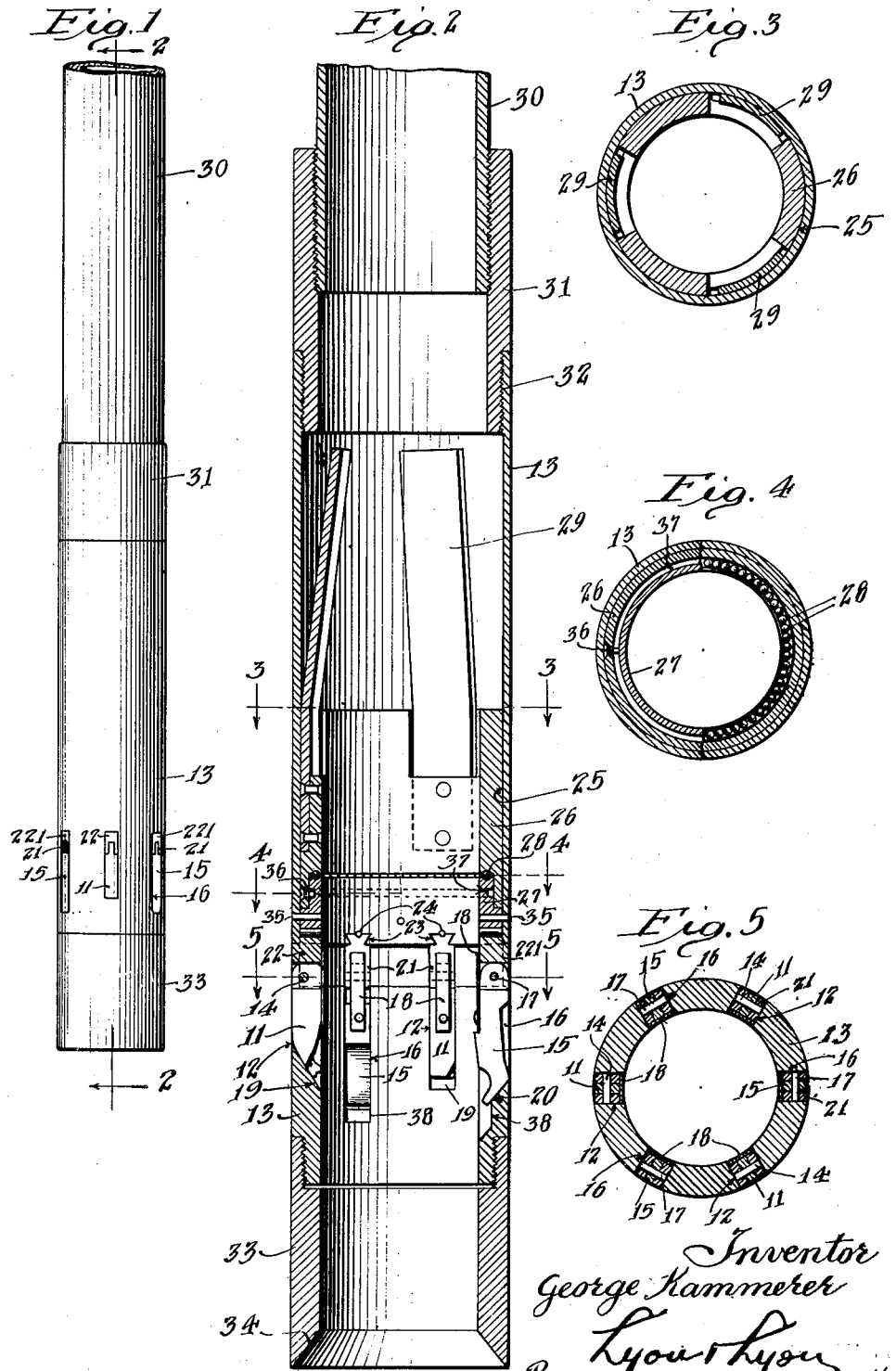

Inventor  
George Kammerer  
By Lyon & Lyon attys

Patented Apr. 19, 1927.

1,625,414

UNITED STATES PATENT OFFICE.

GEORGE KAMMERER, OF FULLERTON, CALIFORNIA, ASSIGNOR TO KAMMERER CORPORATION, OF BREA, CALIFORNIA, A CORPORATION OF CALIFORNIA.

TOOL FOR CUTTING AND REMOVING PIPE FROM WELLS.

Application filed May 3, 1923. Serial No. 636,378.

This invention relates to that type of tool employed in the well drilling art for cutting pipe in the well, and it can be used with great facility in the cutting and removing of sections of the drill stem employed in operating the drill.

This invention is an improvement over that disclosed in my former Patent No. 1,277,600, dated September 3, 1918.

An important object of this invention is to simplify the tool, reducing the number of working parts.

Another important object is to mount the cutter blades in a manner to permit of the tool being inserted in a casing of small diameter relative to the diameter of the pipe to be cut within the casing.

Other objects and advantages will appear in the subjoined detailed description.

The accompanying drawings illustrate the invention:

Figure 1 is a longitudinal view of a tool embodying the invention, a fragment of the member for rotating it also being shown.

Figure 6:
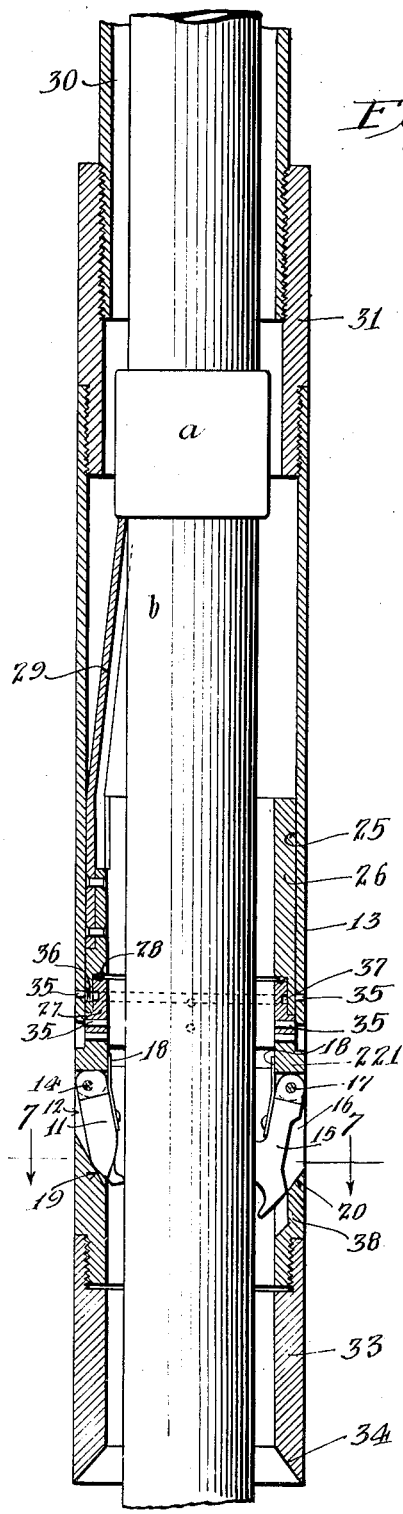
Figure 7:
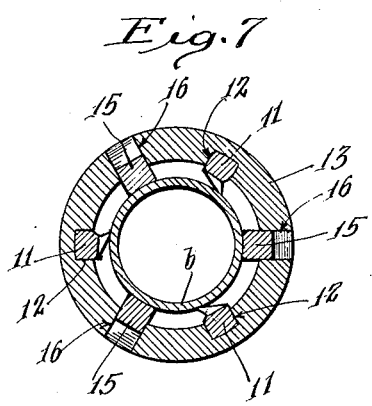

Fig. 2 is an enlarged vertical section on the line indicated by 2—2, Figure 1, the cutter blades and dogs being shown in retracted positions, as when the tool is being lowered around the pipe that is to be cut, Figs. 3, 4 and 5 are plan sections on the lines indicated by 3—3, 4—4, 5—5, respectively, Figure 2, Fig. 6 is a sectional elevation corresponding to figure 2, excepting that the pipe to be cut is shown extending through the tool and the cutter blades and dogs are in pipe-engaging positions and the cutter blade- and dog-actuating member is released, and Fig. 7 is a plan section on the line indicated by 7—7, Figure 6.

There is provided any desired number of cutter blades 11 movably mounted in longitudinally extending slots 12 in a tubular body 13. In this instance the cutter blades 11 are oscillatably mounted in the slots 12, being pivoted at 14 to blocks 22 that have a sliding fit in the slots. The tubular body 13 is adapted to be lowered over the pipe that is to be cut.

Means are provided to hold the pipe, that is to be cut, concentrically of the body 13 while the cutting operation is progressing, and such means may be variously constructed and, in this instance, comprise any desired number of dogs 15 which are movably mounted in longitudinal slots 16 in the body 13. In the particular instance illustrated there are three cutter blades and three dogs and the cutter blades and dogs are alternately arranged. This brings a dog diametrically opposite each cutter blade. In this instance the dogs 15 are rotatably mounted in the slots 16, being pivoted at 17 to blocks 221 that have a sliding fit in the slots 16.

Means are provided for yieldingly holding the cutter blades 11 and dogs 15 retracted within the slots, as in Figure 2. These means comprise flat springs 18 which are secured at their lower ends to the cutter blades and dogs, respectively, and the upper ends of the springs engage the inner face of the body 13.

The lower end walls of the slots 12 are beveled inwardly and downwardly, and constitute cam faces 19 against which the lower ends of the cutter blades are adapted to ride when the body 13 is pulled upward, thus to cause the cutter blades to swing inwardly into engagement with the pipe that is to be cut. Also the lower end walls of the slot 16 are beveled inwardly and downwardly, and constitute cam faces 20 against which the lower ends of the dogs 15 ride to swing said dogs inwardly against the pipe when the body 13 moves upward. Thus the body 13 constitutes a cutter blade- and dog-actuating member.

The upper portion of the tubular body 13 is of reduced internal diameter, as indicated at 25, and within this reduced portion is mounted a bearing comprising upper and lower tubular ball race members 26, 27 and balls 28 between them so as to constitute an antifriction bearing. The pivots 14, 17 are supported in forked lower ends 21 of the blocks 22, 221, said forked ends being positioned in the upper ends of the slots 12 or 16, as the case may be. The upper ends of the blocks 22, 221 are dove-tailed into the lower end of the member 27, as indicated at 23. After the blocks 22, 221, have been driven into place, pins 24 are inserted between the bearing 27 and the blocks to tightly secure said blocks in place. When it is desired to renew the cutter blades, the blocks 22 may be removed, after the pins 24 have been taken out.

The body 13 can be rotated around the bearing member 26. The bearing member 26 carries a number of arms 29 secured at their lower ends to the bearing member. These arms 29, in this instance, extend aslant upwardly and inwardly so as to engage beneath any one of the couplings, indicated at $a$ in Figure 6, of the pipe $b$ that is to be cut. The arms 29 may be of any suitable construction, and are yieldingly held in engagement with the pipe that is to be cut. This is effected by springs and, in this instance, the arms 29 themselves constitute the spring members, but it is to be understood that the arms and springs may be separate, a readily understood mechanical equivalent. In this instance three arms 29 are used, though it is to be understood that the number may be increased or diminished, if desired. The arms 29 constitute one form of means to engage the shoulders $a$, for, when the tool is lowered in the well, the arms will be sprung by the couplings so as to readily pass those couplings by which it is not desired that the arms be held stationary.

The upper end of the tubular body 13 is suitably connected to an operating member which, in this instance, is formed of tubing 30, the connection with the tubing being effected by a coupling 31 to which the body is screw-threaded as indicated at 32.

In the drawings the body 13 is formed, in part, by a shoe 33 which is beveled outwardly and downwardly at its lower end at 34 so that if the shoe strike an obstruction, while it is descending, it will cut the obstruction away.

The bearing member 27 is temporarily secured to the body 13, while the tool is being lowered, so as to prevent relative movement between the cutter blades and cam faces 19 and between the dogs and cam faces 20. In this instance the relative motion is prevented by shear pins 35 connecting the body 13 to the bearing member 27, which is prevented from dropping away from the bearing member 26 by a screw 36 or other device extending from the bearing member 26 into an annular groove 37 in the periphery of the bearing member 27.

In practice, when it is desired to cut a string of pipe in the well, for example a drill stem, into sections and remove said sections one at a time, the tool with the shear pins 35 in place, will be lowered over the drill stem by means of the tube 30 to approximately the level at which the stem is to be cut, the cutter blades and dogs being in their retracted positions. Then the tool will be raised to cause the upper ends of the arms 29 to engage with the coupling $a$, as in Figure 6, to shear the pins 35 and thus release the body 13 from the bearing 27. Further raising of the body 13 will then be effected, while the cutter blades 11 and dogs 15 are thus held against upward movement because of the arms 29 engaging the coupling. As the body 13 rises relative to the cutter blades and dogs, the cam faces function as wedges to force the cutter blades and dogs inwardly against the drill stem, the dogs acting to hold the drill stem concentric in the body.

As soon as the dogs 15 are approximately in engagement with the drill stem they ride off of the inner ends of the cam faces 20, and vertical faces 38 of the body 13 then operate along the dogs to maintain said dogs against further movement while the cutter blades continue to be fed by action of the cam faces 19. Then the tubing 30 will be rotated by any of the usual mechanisms employed for rotating drill stems, or by other suitable mechanism, so as to cause the cutter blades 11 to cut the drill stem, the cam faces 19 operating to gradually feed the cutter blades toward the drill stem as the depth of the cut increases.

After the cutting operation has been completed, the tubing 30 will be withdrawn from the well and with it the body 13 and its associated parts and, since the arms 29 engage beneath the coupling $a$, this withdrawing movement causes the upper cut-off section of the drill stem to be raised at the same time until the upper end of said section is above the top of the well, whereupon the cut off section will be removed from the well and, if necessary to remove more of the drill stem, the tool will be lowered again so as to make another cut and then raised to raise another section of the drill stem. Thus the cutting operations and raising of the cut-off sections of the drill stem will be continued until the well is cleared of the stem, or as much of it as it is desired to remove. If the arms 29 bend sufficiently under the weight of the drill stem, during the raising thereof, the cutter blades themselves will operate to raise the cut off section, since said cutter blades will project beneath the cut end of the upper section.

It is to be noted that when the cutter blades are collapsed they are in approximately vertical position or parallel with the pipe that is to be cut, thus occupying much less radial space than when in cutting position, enabling the tool to be inserted in a casing of comparatively small diameter.

In the above description the tubular members 13, 27, are seen to be relatively movable, the cutter blades are rotatable from collapsed position into cutting position by relative movement between the members 13, 27, and are further rotatable by relative movement between the members 13, 27 to cut the pipe, the arms 29 are connected with the member 27 and engage the shoulder formed by one end of the coupling $a$ to hold the cutter blades against longitudinal movement relative to the pipe, and the tubing 30 constitutes means connected with the other member 13 to move said other member.

I claim:

1. A tool of the class described comprising means engageable by a shoulder on the pipe that is to be cut to hold said means against movement in one direction, a cutter blade pivotally connected to said means, and means engaging the cutter blade and operated by movement in said direction to swing the cutter on its pivot into engagement with the pipe.

2. A tool of the class described comprising a cutter blade, means connected with the cutter blade and engageable by a shoulder on the pipe that is to be cut to hold the cutter blade against longitudinal movement relative to the pipe, means yieldingly holding the cutter blade against rotation, and means engaging the cutter blade and operated by movement opposite to that against which the blade is held to oscillate said blade.

3. A tool of the class described comprising an oscillatably mounted cutter blade, means including a member engageable with a shoulder on the pipe to be cut to hold the cutter blade against longitudinal movement relative to the pipe, and means operable longitudinally of the pipe to effect oscillation of the cutter blade.

4. A tool of the class described comprising an oscillatably mounted cutter blade, means to yieldingly hold the cutter blade in collapsed position approximately parallel with the pipe that is to be cut, means including a member engageable with a shoulder on the pipe to hold the cutter blade against longitudinal movement relative to the pipe, and means operable longitudinally of the pipe to effect oscillation of the cutter blade from collapsed position into cutting position.

5. A tool of the class described comprising a cutter blade, means connected with the cutter blade and engageable by a shoulder on the pipe that is to be cut to hold the cutter blade against longitudinal movement relative to the pipe, and means engaging the cutter blade and operating to turn said blade.

6. A tool of the class described comprising relatively movable members, pivoted cutter blades oscillatable from collapsed position into cutting position by relative movement between the members, means operating to yieldingly hold the cutter blades collapsed, arms connected with one of the members engageable with a shoulder on the pipe that is to be cut, and means connected with the other member to move said other member.

7. A tool of the class described comprising a cutter blade mounted for turning, means including a member engageable with a shoulder on the pipe to be cut to hold the cutter blade against longitudinal movement relative to the pipe, and means operable longitudinally of the pipe to effect turning of the cutter blade.

8. A tool of the class described comprising relatively movable members, one of said members having a slot, means connected with the other member to catch against one end of a drill pipe collar, and a cutter pivoted at its upper end in the slot and normally hanging approximately vertical within said slot, the lower end of the cutter and the bottom wall of the slot being beveled inwardly and downwardly.

9. A tool of the class described comprising relatively movable members, one of said members having a slot, a third member rotatably connected with the remaining member, means connected with the third member to catch against one end of a drill pipe collar, and a cutter pivoted at its upper end in the slot and normally hanging approximately vertical within said slot, the lower end of the cutter and the bottom wall of the slot being beveled inwardly and downwardly.

10. A tool of the class described comprising relatively movable members, one of said members having a slot, means connected with the other member to catch against one end of a drill pipe collar, a cutter pivoted at its upper end in the slot and normally hanging approximately vertical within said slot, the lower end of the cutter and the bottom wall of the slot being beveled inwardly and downwardly, and a shear pin connecting the two members and preventing such relative movement therebetween as would swing the cutter inwardly.

11. A tool of the class described comprising inner and outer tubular members in sliding relation, the outer member having a slot, the inner member having a block slidably fitting in the slot, and a cutter pivoted to the block and normally hanging approximately vertical in the slot, the lower end of the cutter and the bottom wall of the slot being beveled inwardly and downwardly.

12. A tool of the class described comprising inner and outer tubular members in sliding relation, the outer member having a slot, a block dove-tailed into the lower end of the inner member, and a cutter pivoted to the block and normally hanging approximately vertical in the slot, the lower end of the cutter and the bottom wall of the slot being beveled inwardly and downwardly.

13. A tool of the class described comprising an oscillatably mounted cutter blade, said cutter blade adapted when in collapsed position to lie approximately parallel with the pipe that is to be cut, means including a member engageable with a shoulder on the pipe to hold the cutter blade against longitudinal movement relative to the pipe, and means operable longitudinally of the pipe to effect oscillation of the cutter blade from collapsed position into a cutting position approximately at a right angle to said pipe.

14. A tool of the character described comprising a cutter blade, means connected with the cutter blade and engageable with the pipe that is to be cut to hold the cutter blade against longitudinal movement relative to the pipe, and means engaging the cutter blade and operating to rotate said blade.

GEORGE KAMMERER.